United States Patent
Choi (10) Patent No.: US 7,725,741 B2
(45) Date of Patent: May 25, 2010

(54) COMPUTER SYSTEM AND POWER SUPPLYING METHOD THEREOF

(75) Inventor: Yeong-bok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

(21) Appl. No.: 11/500,420

(22) Filed: Aug. 8, 2006

(65) Prior Publication Data

US 2007/0055900 A1  Mar. 8, 2007

(30) Foreign Application Priority Data

Sep. 5, 2005  (KR) ................ 10-2005-0082456

(51) Int. Cl.
*G06F 1/00* (2006.01)
*G06F 1/26* (2006.01)

(52) U.S. Cl. .......... 713/300; 713/310; 713/320; 713/321; 713/322; 713/323; 713/324; 713/330; 713/340

(58) Field of Classification Search ........ 713/300, 713/310, 320–324, 330, 340
See application file for complete search history.

(56) References Cited

U.S. PATENT DOCUMENTS 7,080,268 B2 *  7/2006  Mosley ............ 713/320

FOREIGN PATENT DOCUMENTS

| JP | 2003-116270 | 4/2003 |
|---|---|---|
| KR | 2004-107737 | 12/2004 |
| KR | 10-536577 | 12/2005 |

OTHER PUBLICATIONS

English Abstract of Korean Publication No. 2000-1274 A.

* cited by examiner

*Primary Examiner*—Abdelmoniem Elamin
(74) *Attorney, Agent, or Firm*—Jefferson IP Law, LLP (57) ABSTRACT

A computer system and a power supplying method thereof in which noise due to switched power mode is reduced for a user's convenience. The computer system comprises a mode determiner to generate a mode signal comprising a predetermined part corresponding to one among a plurality of power modes; a power supply to supply power having a level of voltage corresponding to the mode signal to a central processing unit; and a mode controller to maintain or convert the predetermined part of the mode signal corresponding to one among the plurality of power modes to lower a difference in the level of voltage when the power mode is switched from a first level of voltage to a second level of voltage, wherein the second level of voltage is higher than the first level of voltage.

27 Claims, 6 Drawing Sheets

COMPUTER SYSTEM AND POWER SUPPLYING METHOD THEREOF

CROSS-REFERENCE TO RELATED APPLICATIONS

This application claims the benefit of Korean Patent Application No. 2005-82456, filed on Sep. 5, 2005, in the Korean Intellectual Property Office, the disclosure of which is incorporated herein by reference.

BACKGROUND OF THE INVENTION

1. Field of the Invention

Aspects of the present invention relate to a computer system and a power supplying method thereof, and more particularly, to a computer system and a power supplying method thereof in which noise due to a switched power mode is reduced for a user's convenience.

2. Description of the Related Art

Portable computer systems, such as notebook computers, personal digital assistants (PDAs), or the like, have become widely used in recent times. Accordingly, many technical developments have been made in a central processing unit (CPU) of the computer system, and thus the portable computer system can perform various high-level functions.

To make the CPU of the computer system operate normally, power should be properly supplied to the CPU. A power supply of the computer system comprises an adapter and/or a battery as a main power supply. Here, the adapter converts alternative current (AC) power into direct current (DC) power. The power supply of the computer system further comprises a DC/DC converter as an auxiliary power supply for supplying power to various integrated circuits (IC) installed in the computer system.

Meanwhile, a switched-mode power supply (SMPS), such as a synchronous buck converter, is widely used for the CPU of the portable computer system. In particular, the synchronous buck converter for the CPU supplies power at various voltage levels to the CPU according to operating states of the CPU so as to reduce power consumption of the computer system.

Figure 1:
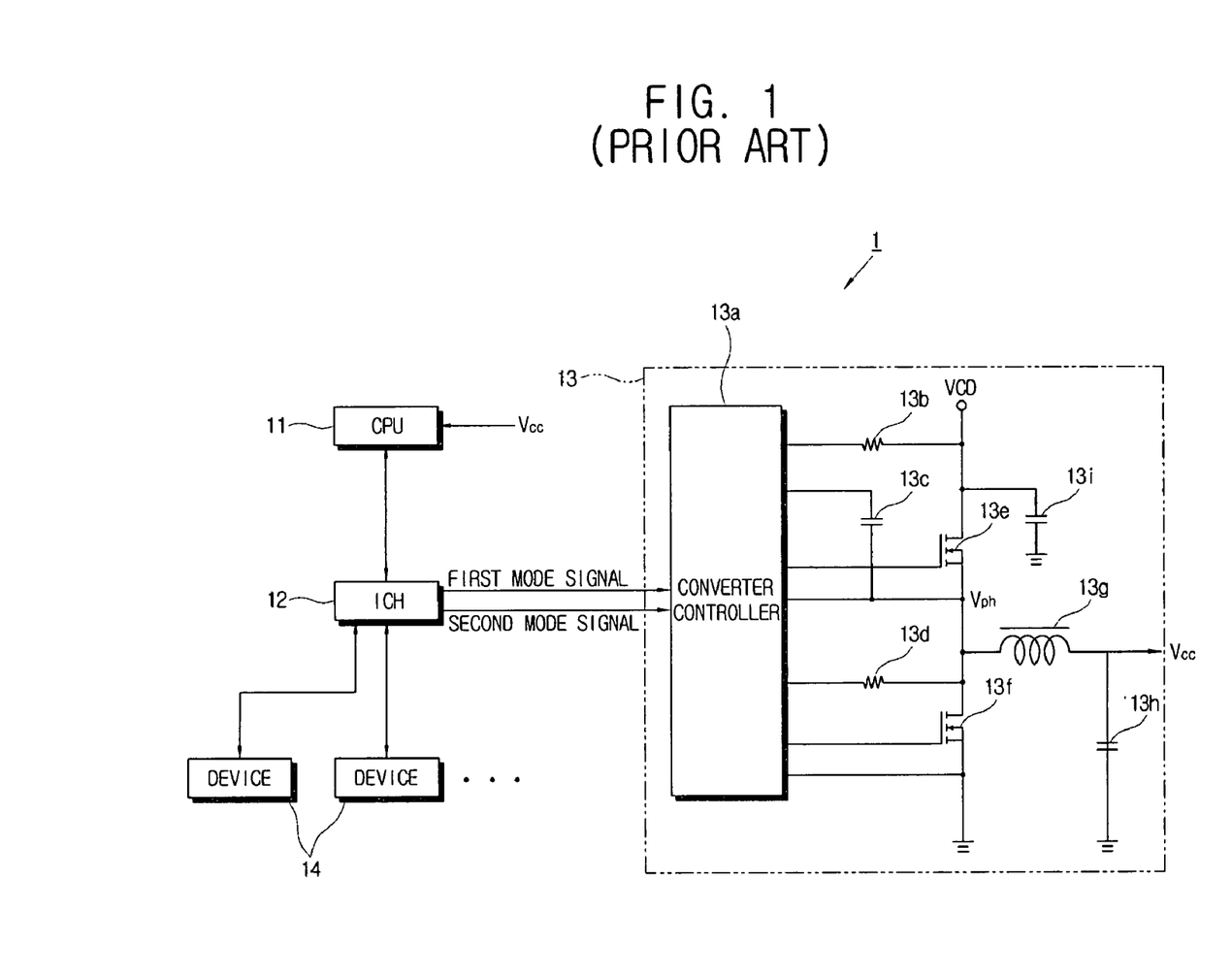

FIG. 1 illustrates a schematic configuration of a conventional computer system employing the synchronous buck converter. A computer system 1 comprises a CPU 11 to execute commands for generally controlling the computer system; a plurality of devices 14 such as a keyboard, a mouse, a universal serial bus (USB) unit, a hard disc drive, and the like, which are needed for performing operations of the computer system; and an I/O control hub (ICH) 12 for checking the state of the plurality of devices 14 and generating a signal to determine a voltage level for operating the CPU 11 according to the checked states of the devices 14. Further, the computer system 1 includes a synchronous DC/DC converter 13 for converting a voltage level of input power in order to supply the appropriate amount of power to the CPU 11.

The ICH 12 receives information about the operating states of the devices 14, and transmits a mode signal for determining a power mode corresponding to the received information to the DC/DC converter 13, thereby implementing a plurality of power modes with varying voltage levels according to the operating states of the CPU 11. The ICH 12 of FIG. 1 generates two mode signals, a first mode signal and a second mode signal, to determine a power mode.

The DC/DC converter 13 receives the first mode signal and the second mode signal from the ICH 12, and outputs a voltage level corresponding to the received signals. The DC/DC converter 13 comprises two metal oxide semiconductor field effect transistors (MOSFETs) 13e and 13f; an inductor 13g and a capacitor 13h to store and discharge a current that flows according to operations of the MOSFETs 13e and 13f; an input capacitor 13i to smooth an input voltage VCD; a converter controller 13a for controlling the operations of two MOSFETs 13e and 13f on the basis of the first mode signal and the second mode signal generated by the ICH 12; and resistors 13b and 13d and a capacitor 13c required for further operations.

The converter controller 13a supplies a gate voltage to each gate of the MOSFETs 13e and 13f to alternately turn on and off two MOSFETs 13e and 13f. When the converter controller 13a turns on the MOSFET 13e, the MOSFET 13f is turned off. In this case, current energy is charged in the inductor 13g. On the other hand, when the converter controller 13a turns on the MOSFET 13f, the MOSFET 13e is turned off. In this case, the current energy charged in the inductor 13g is discharged as output power to be supplied to the CPU 11. The converter controller 13a adjusts a duty ratio to turn on/off two MOSFETs 13e and 13f on the basis of the first mode signal and the second mode signal generated from the ICH 12.

Meanwhile, the computer system 1 has five power modes C0, C1, C2, C3 and C4, which differ in voltage levels according to the operating state of the CPU 11. The operating states corresponding to these power modes and related signals are shown in Table 1.

TABLE 1

| | Power mode | | | | |
|---|---|---|---|---|---|
| | C0 | C1 | C2 | C3 (deep sleep mode) | C4 (deeper sleep mode) |
| CPU operating state | Program codes execution | Short term standby mode | Standby mode | Medium standby mode | Long term standby mode |
| CPU input voltage (Vcc) | | 1.356 (V) | | 1.193 (V) | 0.726 (V) |
| First mode signal | low | low | low | low | high |
| Second mode signal | high | high | high | low | low |

Figure 2A:
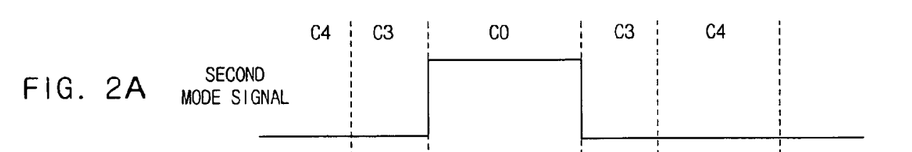
FIGS. 2A-2E illustrate waveforms of various signals according to operations of a conventional computer system.
Figure 2B:
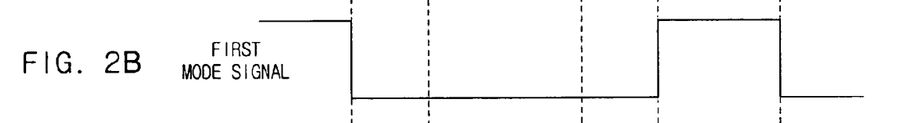
Figure 2C:
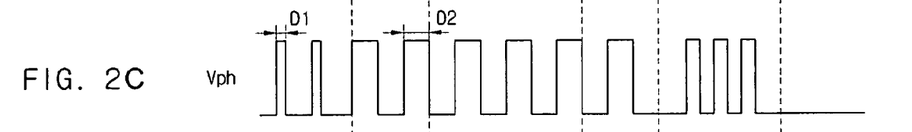
Figure 2D:
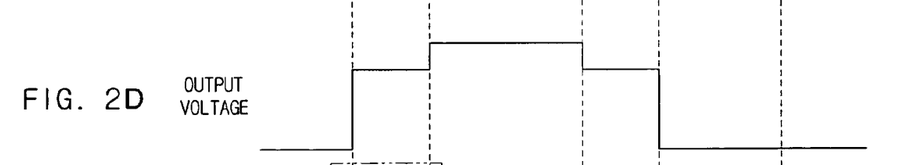

FIGS. 2A-2E illustrate waveforms of various signals according to operations of the conventional computer system 1 based on the five power modes. In FIG. 2C, Vph, which is a voltage representing the operating states of two MOSFETs 13e and 13f, becomes "high" when the MOSFET 13e is turned on, and becomes "low" when the MOSFET 13f is turned on. In other words, the current energy is charged in the inductor 13g when Vph is in a "high" state. On the other hand, the current energy charged in the inductor 13g is discharged as an output voltage Vcc when Vph is in a "low" state. Periods of time D1 and D2 during which Vph maintains the "high" state are varied according to power modes, and are controlled by the converter controller 13a on the basis of the first mode signal and the second mode signal. When Vph maintains the "high" state for a relatively short period of time D1, the output voltage Vcc becomes lower. On the other hand, when Vph maintains the "high" state for a relatively long period of time D2, the output voltage Vcc becomes higher.

Figure 2E:
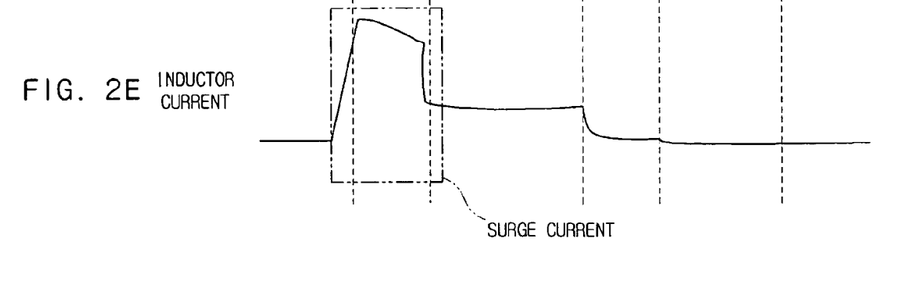

Meanwhile, referring to Table 1, a voltage difference between the power mode C0, C1 or C2 and the power mode C3 is 0.163(V), while a voltage difference between the power mode C3 and the power mode C4 is 0.467(V). Therefore, the voltage difference between the power modes C3 and C4 is the largest among the voltage differences between the power modes. Thus, when the power mode is changed from C4 to C3, the computer system 1 performs an operation for boosting up the output voltage Vcc. At this time, a very high current, i.e., a surge current, instantaneously flows in the inductor 13g as shown in FIG. 2E. When the surge current flows, various devices of the computer system 1, such as the capacitor 13h and the inductor 13g, generate loud noises, thereby causing a user some inconvenience.

SUMMARY OF THE INVENTION

Aspects of the present invention provide a computer system and a power supplying method thereof, in which noise due to switched power mode is reduced for a user's convenience.

Additional aspects and/or advantages of the invention will be set forth in part in the description which follows and, in part, will be obvious from the description, or may be learned by practice of the invention According to an aspect of the present invention, there is provided a computer system with a central processing unit and a plurality of power modes differing in a level of voltage to be supplied to the central processing unit according to operating states of the central processing unit, the computer system comprising: a mode determiner to generate a mode signal comprising a predetermined part corresponding to one among the plurality of power modes; a power supply to supply power having the level of voltage corresponding to the mode signal to the central processing unit; and a mode controller to maintain or convert the predetermined part of the mode signal corresponding to one among the plurality of power modes to lower a difference in the level of voltage when the power mode is switched from a first level of voltage to a second level of voltage, wherein the second level of voltage is higher than the first level of voltage.

The power supply may, although not necessarily, adjust the level of voltage supplied to the central processing unit by alternately charging and discharging input power in a predetermined ratio on the basis of the mode signal, and the mode controller converts the mode signal from a time when the input power is charged to a time when a predetermined period is delayed after the input power is discharged.

The mode controller may, although not necessarily, comprise: a switching unit to output signals having logic states corresponding to charging and discharging the input power, respectively; a first delaying unit to delay the output signal of the switching unit by a first period; a signal holding unit to receive the mode signal corresponding to the first level, and synchronize the mode signal with an output signal of the first delaying unit; a second delaying unit to delay an output signal of the signal holding unit by a second period; a third delaying unit to delay the output signal of the switching unit by a third period; and a buffering unit to transmit the output signals from the second and third delaying units as the mode signal corresponding to the second level to the power supply.

The first period, the second period, and the third period may, although not necessarily, be set to make the predetermined part of the mode signal corresponding to the second level become low, in the case where the predetermined part of the mode signal corresponding to the first level is low.

The first period, the second period, and the third period may, although not necessarily, be set to make the logic state of the mode signal corresponding to the second level become low from the time when the input power is charged to the time a predetermined period is delayed after the input power is discharged, in the case where the logic state of the mode signal corresponding to the first level is high.

According to another aspect of the present invention, there is provided a method of supplying power to a computer system with a central processing unit, the method comprising: generating a mode signal corresponding to one among a plurality of power modes different in a level of voltage to be supplied to the central processing unit according to operating states of the central processing unit; converting a predetermined part of the mode signal corresponding to a power mode of a first level into a mode signal corresponding to a power mode of a second level higher than the first level to lower the level difference of power than a predetermined value when the power mode is switched; and supplying the power having a level corresponding to the mode signal to the central processing unit.

Supplying the power may, although not necessarily, comprise adjusting a level of power supplied to the central processing unit by alternately charging and discharging input power in a predetermined ratio on the basis of the mode signal, and the converting the mode signal may, although not necessarily, comprise converting the mode signal from a time when the input power is charged to a time when a predetermined period is delayed after the input power is discharged.

BRIEF DESCRIPTION OF THE DRAWINGS

These and/or other aspects and advantages of the invention will become apparent and more readily appreciated from the following description of the embodiments, taken in conjunction with the accompany drawings of which FIG. 1 a block diagram showing a schematic configuration of a conventional computer system including a synchronous buck converter.

DETAILED DESCRIPTION OF THE EMBODIMENTS

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 3:
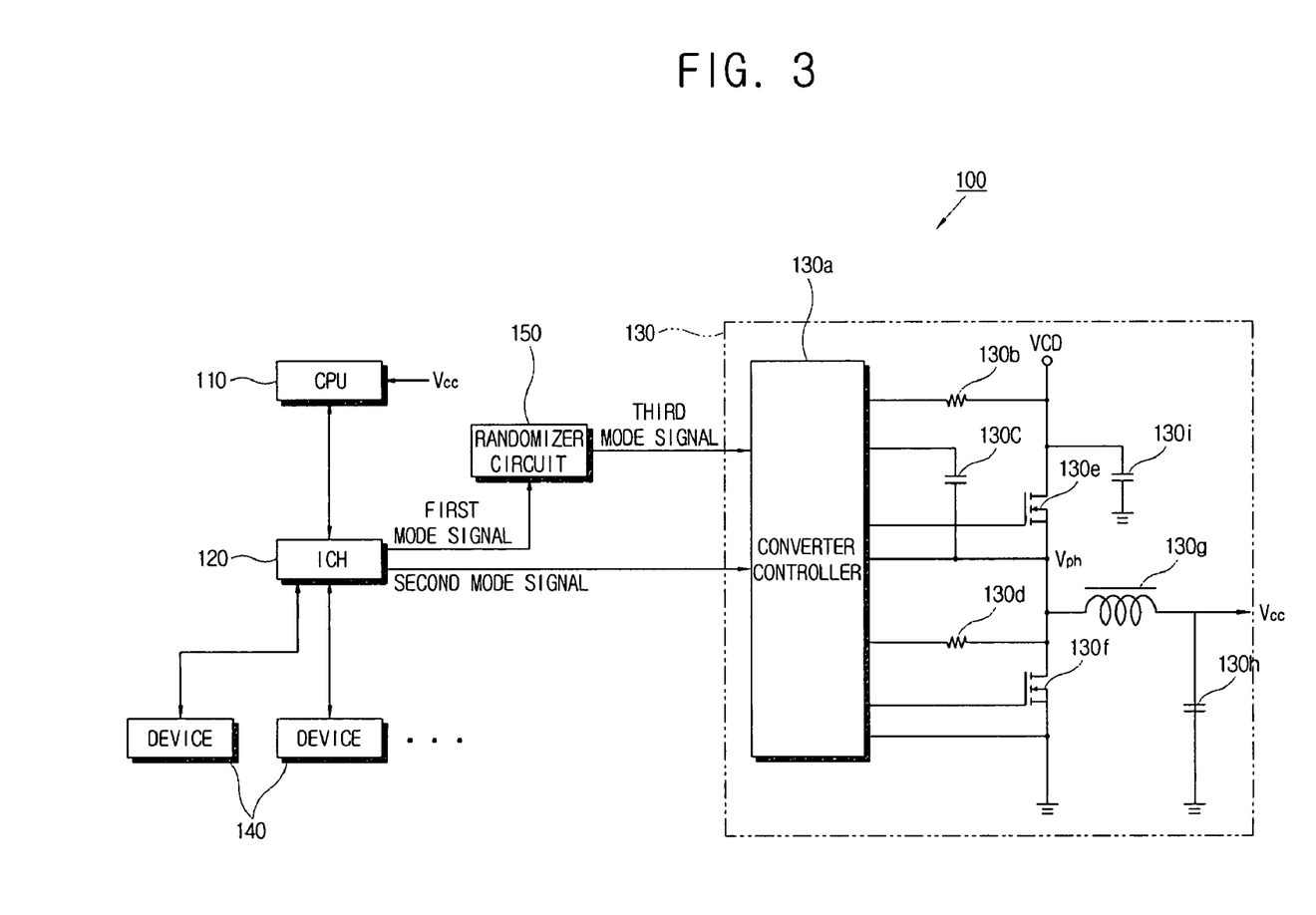
FIG. 3 is a block diagram showing a schematic configuration of a computer system according to an embodiment of the present invention.

FIG. 3 is a block diagram showing a schematic configuration of a computer system 100 according to an embodiment of the present invention. A computer system 100 according to the present embodiment comprises a CPU 110, a plurality of devices 140, an ICH 120, a DC/DC converter 130 and a randomizer circuit 150. The CPU 110 executes commands for generally controlling the computer system 100. The plurality of devices 140 comprises at least one of a keyboard, a mouse, a USB unit, a hard disc drive, and the like, which are needed for performing operations of the computer system 100. The ICH 120 checks the states of the plurality of devices 140 and generates a signal to determine a voltage level for operating the CPU 110 according to the checked states of the plurality of devices 140. The randomizer circuit 150 converts a part of a signal corresponding to a low level power mode into a signal corresponding to a high level power mode. The DC/DC converter 130 converts a power level of input power and supplies a power with a level corresponding to the signal generated from the ICH 120 and the signal converted by the randomizer circuit 150 to the CPU 110. The CPU 110, the ICH 120, the DC/DC converter 130, and the randomizer circuit 150 according to this embodiment are described as examples of a central processor, a mode determiner, a power supply, and a mode controller, respectively.

The ICH 120 generates two mode signals corresponding to one of a plurality of power modes so that power is supplied by voltage levels that differ according to operating states of the CPU 110. That is, the ICH 120 receives information about the operating states of the devices 140, and transmits two mode signals assigning the power mode corresponding to the received information to the DC/DC converter 130. The ICH 120 generates two mode signals, a first mode signal and a second mode signal, for determining the power mode. In this embodiment, the computer system 100 has five power modes (e.g., C0, C1, C2, C3 and C4, as shown in the aforementioned Table 1).

The randomizer circuit 150 receives the first mode signal from the ICH 120, and converts a logic state of the first mode signal in a predetermined period for switching the power mode, and outputs the converted first mode signal as a third mode signal. In more detail, the randomizer circuit 150 checks the logic state of the first mode signal. When the randomizer circuit 150 determines that the first mode signal has the logic state corresponding to a low-level power mode, the randomizer circuit 150 converts the first mode signal into the third mode signal having the logic state corresponding to a power mode higher than that of the first mode signal, and outputs it to the DC/DC converter 130.

The DC/DC converter 130 receives the second mode signal from the ICH 120 and the third mode signal from the randomizer circuit 150, and outputs a voltage level corresponding to the received signals as an output voltage Vcc to the CPU 110. In this embodiment, the DC/DC converter 130 includes two MOSFETs 130e and 130f; an inductor 130g and a capacitor 130h to store and discharge a current that flows according to operations of the MOSFETs 130e and 130f; an input capacitor 130i for smoothing an input voltage VCD; a converter controller 130a for controlling the operations of two MOSFETs 130e and 130f on the basis of the second mode signal from the ICH 120 and the third mode signal from the randomizer circuit 150; and resistors 130b and 130d and a capacitor 130c required for other operations.

The converter controller 130a supplies a gate voltage to each gate of the MOSFETs 130e and 130f to alternately turn on and off two MOSFETs 130e and 130f. When the converter controller 130a turns on the MOSFET 130e, the MOSFET 130f is turned off. In this case, current energy is charged in the inductor 130g. On the other hand, when the converter controller 130a turns on the MOSFET 130f, the MOSFET 130e is turned off. In this case, the current energy charged in the inductor 130g is discharged and outputted as the output power Vcc to the CPU 110. The converter controller 130a adjusts a duty ratio to turn on/off two MOSFETs 130e and 130f on the basis of the first mode signal from the ICH 120 and the third mode signal from the randomizer circuit 150.

The converter controller 130a controls the level of the output voltage Vcc corresponding to each power mode by adjusting a duty ratio of Vph; that is, a ratio of a period of time while the MOSFET 130e is turned on, i.e., Vph is high, to a period of time while the MOSFET 130f is turned on, i.e., Vph is low. When Vph is high for a relatively short time, i.e., the duty ratio of Vph is low, the output voltage Vcc becomes lower. On the other hand, when Vph is high for a relatively long time, i.e., the duty ratio of Vph is high, the output voltage Vcc becomes higher.

According to the present embodiment, the randomizer circuit 150 converts the first mode signal, which is received from a time when the input voltage VCD of the DC/DC converter 130 is charged to a time when a predetermined period is delayed after the charged current energy is discharged, into the third mode signal having the logic state corresponding to the power mode of C3 on the basis of Vph received from the DC/DC converter 130 while the CPU 110 has the power mode of C4.

Figure 4:
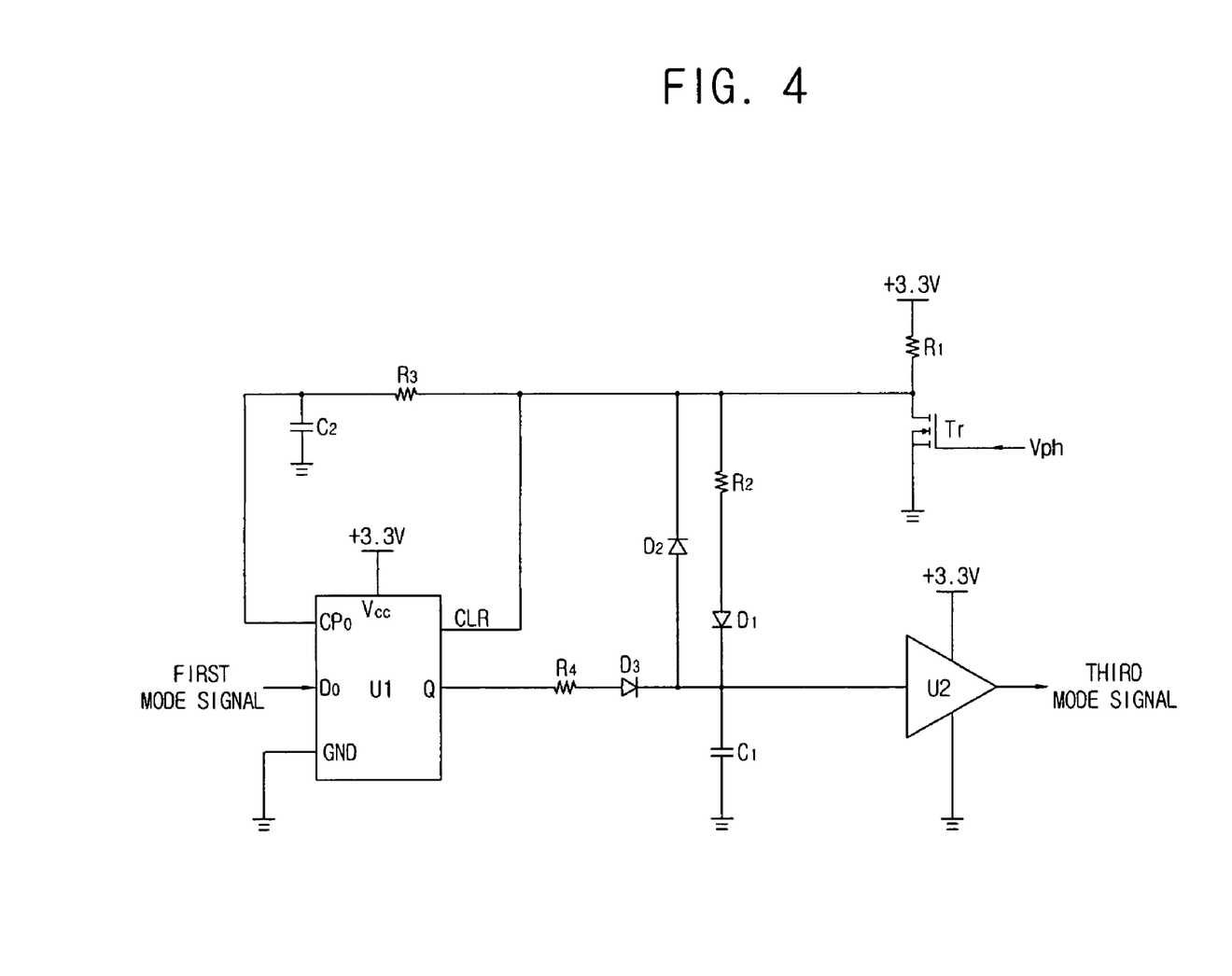
FIG. 4 is a circuit diagram illustrating a detailed configuration of a randomizer circuit according to an embodiment of the present invention.

FIG. 4 is a circuit diagram illustrating a detailed configuration of the randomizer circuit 150 according to the present embodiment of the present invention. The randomizer circuit 150 includes a MOSFET Tr to perform a switching operation by receiving Vph as a gate voltage; a resistor R3 and a capacitor C2 acting as a delay device for delaying a drain voltage of the MOSFET Tr by a predetermined period of time; a D flip-flop U1 regarding the drain voltage of the MOSFET Tr delayed by the resistor R3 and the capacitor C2 as a clock CP0, and the first mode signal from the ICH 120 as an input D0; a resistor R4 and a capacitor C1 acting as a delay device for delaying an output Q of the D flip-flop U1 by a predetermined period of time; a resistor R2 and a capacitor C1 acting as a delay device for delaying the drain voltage of the MOSFET Tr via a path different from that of the resistor R3 and the capacitor C2 by a predetermined period of time; and a buffer U2 receiving a voltage applied to the capacitor C1 and outputting the third mode signal. The randomizer circuit 150 further comprises a resistor R1 connected to an input power +3.3(V) of the MOSFET Tr; a diode D2 allowing a current to flow only when the voltage is discharged from the capacitor C1; and diodes D1 and D3 to prevent a reverse current. In the present embodiment, the MOSFET Tr, the resistor R3 and the capacitor C2, the D flip-flop U1, the resistor R4 and the capacitor C1, the resistor R2 and the capacitor C1, and the buffer U2 are described as examples of a switching unit, a first delaying unit, a signal holding unit, a second delaying unit, a third delaying unit, and a buffering unit, respectively.

In the randomizer circuit 150, when Vph is high, the MOSFET Tr is turned on so that a current based on the input power +3.3(V) flows through the drain and the source of the MOSFET Tr. In this case, the drain voltage of the MOSFET Tr becomes low, and the clear CLR and the clock CP0 of the D flip-flop U1 become low, so that the output Q of the D flip-flop U1 becomes low regardless of the logic state of the first mode signal. Further, the voltage charged in the capacitor C1 is directly discharged through the drain and the source of the MOSFET Tr, so that the input of the buffer U2 becomes low, thereby outputting the third mode signal having a low level, corresponding to a higher level power mode than that of the signal for C4.

On the other hand, when Vph is low, the MOSFET Tr is turned off so that a current based on the input power +3.3(V) flows through the resistors R3 and R2. In this case, the drain voltage Vd of the MOSFET Tr becomes high, and the logic state of the first mode signal is outputted through the output Q. At this time, whether the logic state of the first mode signal is transmitted to the input of the buffer U2 is determined depending on the delay period due to the resistor R3 and the capacitor C2, the resistor R4 and the capacitor C1, and the resistor R2 and the capacitor C1; that is, depending on the time constant of each resistor and each capacitor. In the randomizer circuit 150 according to the present embodiment, the delay period due to the resistor R3 and the capacitor C2 and the resistor R4 and the capacitor C1 is set to be shorter than the delay period due to the resistor R2 and the capacitor C1. For example, the resistor R3 has a resistance of 100Ω, the capacitor C2 has a capacitance of 47 pF, the resistor R4 has a resistance of 47Ω, the capacitor C1 has a capacitance of 1.0 nF, the resistor R2 has a resistance of 100KΩ, and the resistor R1 has a resistance of 4.7Ω. In this case, the logic state of the first mode signal is directly transmitted to the input of the buffer U2, and outputted as the third mode signal. Here, the third mode signal is outputted while having the same logic state as the first mode signal from a time when Vph is changed into a low level until after the delay period due to the resistor R3 and the capacitor C2 and the resistor R4 and the capacitor C1 is elapsed.

Thus, the randomizer circuit 150 outputs the third mode signal having the same logic state as the first mode signal when the first mode signal is low. In other words, the power modes are C0, C1, C2 and C3 when the first mode signal is low, and the randomizer circuit 150 does not switch the power mode under the power modes of C0, C1, C2 and C3. In this case, the third mode signal continuously maintains the low level regardless of whether Vph is high or low, so that the delay period due to the resistor R3 and the capacitor C2 and the resistor R4 and the capacitor C1 does not have an effect on the power mode.

On the other hand, the first mode signal is switched according to the states of Vph and outputted as the third mode signal when the first mode signal is high. The first mode signal is high when the power mode is C4. The third mode signal having a low level is outputted at approximately the same time when Vph becomes high. At this time, the power mode is switched into C3. When Vph is changed from high into low, the third mode signal maintains a low level until the delay period due to the resistor R3 and the capacitor C2 and the resistor R4 and the capacitor C1 elapses. During this time, the power mode remains in C3. When the foregoing delay period elapses during the first mode signal corresponding to the power mode of C4, the third mode signal returns to the same high level as the first mode signal.

When the Vph is high and when during the delay period after the Vph is changed from high to low, the DC/DC converter 130 receives the third mode signal corresponding to the power mode of C3, and performs the corresponding operation. The DC/DC converter 130 checks the level of the output voltage Vcc, and controls the MOSFETs 130e and 130f to be turned on and off on the basis of the level of the output voltage Vcc, so that the DC/DC converter 130 selectively performs either the control corresponding to the level of the output voltage Vcc or the control corresponding to the third mode signal corresponding to the power mode of C3 during the power mode of C4. That is, the DC/DC converter 130 performs the operation corresponding to the power mode of C4 or corresponding to the power mode of C3 according to the states of the third mode signal. During the power mode of C4, the DC/DC converter 130 operates like the power mode of C4 when the third mode signal maintains the high state for a relatively long time, but operates like the power mode of C3 when the third mode signal maintains the low state for a relatively long time. Experimentally, when the power mode is switched from C4 into C3, the level of the output voltage Vcc increases within the levels of the output voltage Vcc corresponding to the power modes of C4 and C3 in inverse proportion to the duty ratio of the third mode signal.

According to the present embodiment, the desired level of the output voltage Vcc can be selected between the levels of the output voltage Vcc corresponding to the power modes of C4 and C3 by adjusting the delay period due to the resistor R3 and the capacitor C2 and the resistor R4 and the capacitor C1. For example, when the delay period due to the resistor R3 and the capacitor C2 and the resistor R4 and the capacitor C1 decreases, an operating time under the power mode of C4 becomes longer and an operating time under the power mode of C3 becomes shorter, so that the level of the output voltage Vcc becomes lower. On the other hand, when the delay period due to the resistor R3 and the capacitor C2 and the resistor R4 and the capacitor C1 increases, an operating time under the power mode of C4 becomes shorter and an operating time under the power mode of C3 becomes longer, so that the level of the output voltage Vcc becomes higher. Such a delay period is set to reduce a difference between the levels of the output voltages corresponding to the power modes of C4 and C3, thereby preventing noise from occurring in the device such as the inductor 130g or the like when the power mode is switched from C4 into C3.

Figure 5A:
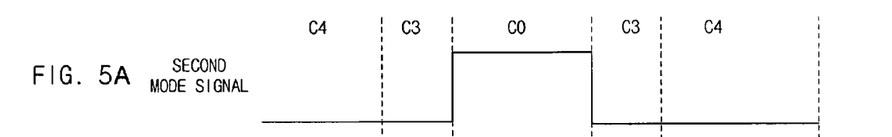
FIGS. 5A-5F illustrate waveforms of various signals according to operations of an embodiment of the present invention.
Figures 5B, 5C:
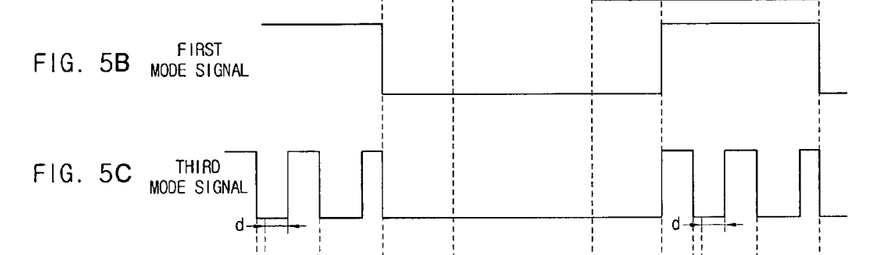
Figure 5D:
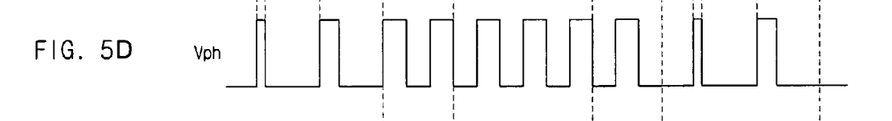
Figure 5E:
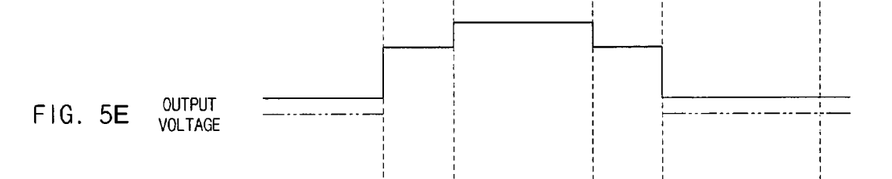
Figure 5F:
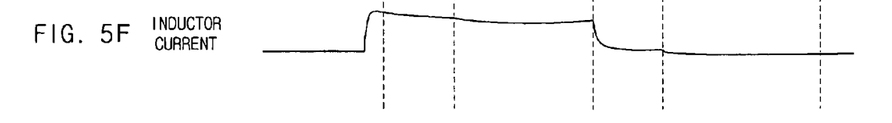

FIGS. 5A-5F illustrate waveforms of various signals according to operations of the computer system 100 according to the present embodiment of the present invention. As shown in FIGS. 5A-5F, the third mode signal is switched depending on Vph during the power mode of C4, so that the third mode signal is in the power mode of C3 for a predetermined period of time. In FIG. 5C, "d" indicates the delay period due to the resistor R3 and the capacitor C2 and the resistor R4 and the capacitor C1 of the randomizer circuit 150. As a time when Vph maintains the high state increases, the level of the output voltage Vcc becomes higher as compared with the case where only the power mode of C4 is kept (refer to the chain double-dashed line of FIG. 5E). Thus, the difference between the levels of the output voltages corresponding to the power modes of C4 and C3 is reduced, so that a surge current (refer to the chain double-dashed line of FIG. 2E) flowing in the inductor 130g is largely decreased, thereby removing noise from the devices such as the inductor 130g or the like.

Figure 6:
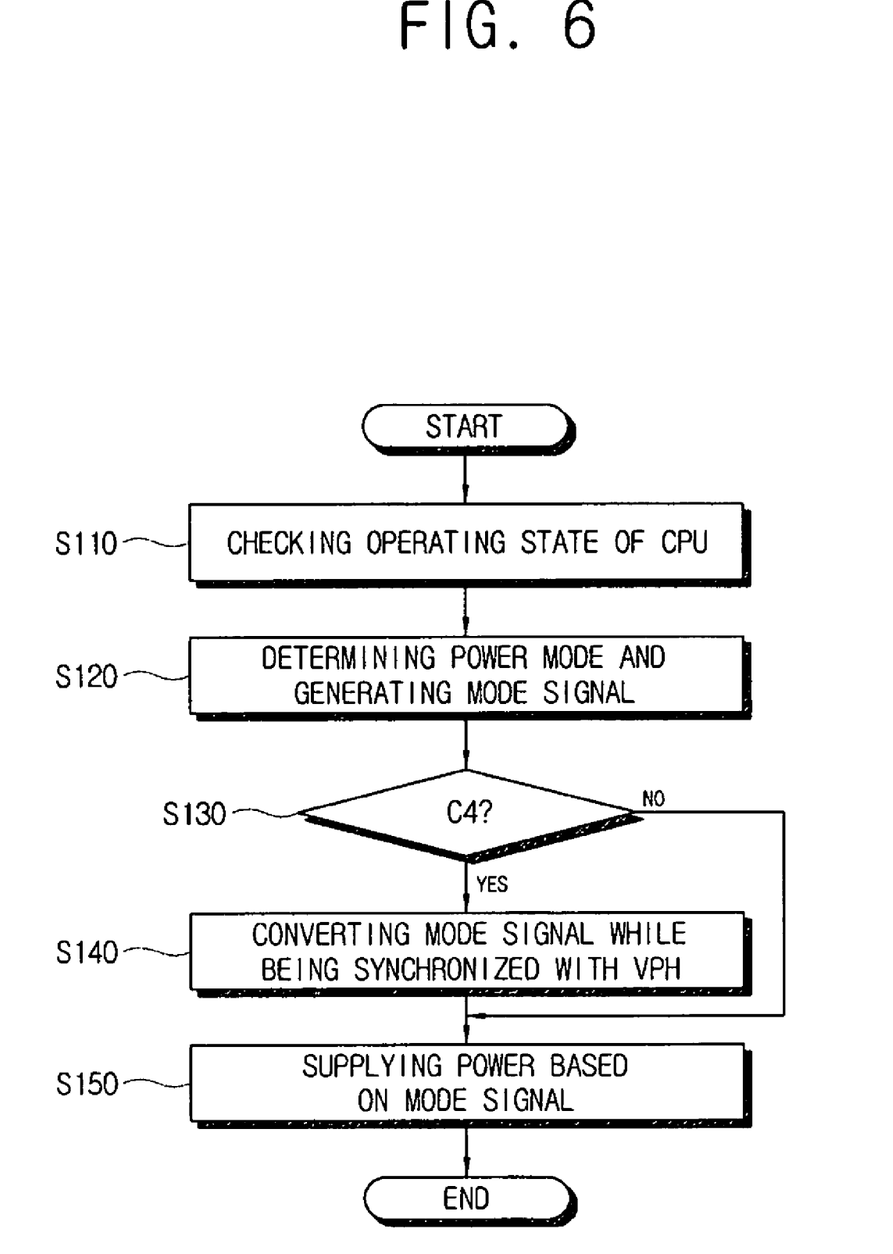
FIG. 6 is a flowchart showing schematic operations of a computer system according to an embodiment of the present invention.

FIG. 6 is a flowchart showing schematic operations of a computer system according to an embodiment of the present invention. At operation S110, the computer system 100 collects information about the states of the devices 140, and determines the operating state of the CPU 110. At operation S120, the computer system 100 generates the mode signal to determine the power mode according to the determined operating states of the CPU 110. At operation S130, the computer system 100 checks whether the current power mode is C4 as the power mode having the low level among a pair of power modes with a large level difference. At operation S140, the computer system 100 synchronizes the mode signal with Vph and converts a predetermined part of the mode signal to correspond to the power mode of C3 in the case where the power mode is C4. At operation S150, the computer system 100 supplies power to the CPU 110 on the basis of the converted mode signal.

The present invention provides a computer system and a power supplying method thereof, in which noise due to a switched power mode is reduced for a user's convenience.

Further, as the noise due to the switched power mode is reduced, a relatively low cost capacitor such as a ceramic capacitor can be used as a component device, so that a production cost is reduced.

Although a few embodiments of the present invention have been shown and described, it would be appreciated by those skilled in the art that changes may be made in this embodiment without departing from the principles and spirit of the invention, the scope of which is defined in the appended claims and their equivalents.

What is claimed is:

1. A computer system with a central processing unit and a plurality of power modes differing in a level of voltage to be supplied to the central processing unit according to operating states of the central processing unit, the computer system comprising:
a mode determiner to generate a mode signal comprising a predetermined part corresponding to one among the plurality of power modes;
a power supply to supply power having the level of voltage corresponding to the mode signal to the central processing unit; and
a mode controller to convert the predetermined part of the mode signal corresponding to one among the plurality of power modes to lower a difference in the level of voltage when the power mode is switched from a first level of voltage to a second level of voltage, wherein the second level of voltage is higher than the first level of voltage.

2. The computer system as claimed in claim 1, wherein the mode determiner generates a first mode signal and a second mode signal, each comprising the predetermined part corresponding to one among the plurality of power modes.

3. The computer system as claimed in claim 2, wherein the mode controller maintains or converts the predetermined part of the first mode signal.

4. The computer system as claimed in claim 1, wherein the mode controller converts the predetermined part of the mode signal corresponding to the first level of voltage to correspond to the second level of voltage.

5. The computer system as claimed in claim 4, wherein:
the power supply adjusts the level of voltage supplied to the central processing unit by alternately charging and discharging input power in a predetermined ratio based on the mode signal, and
the mode controller converts the predetermined part of the mode signal from a time when the input power begins to charge to a time when a predetermined delay period elapses after the input power is discharged.

6. The computer system as claimed in claim 5, wherein a higher the predetermined ratio is, then a higher the level of voltage supplied by the power supply, a longer a time the input power charges, and a shorter a time the input power discharges.

7. The computer system as claimed in claim 5, wherein the mode controller comprises:
a switching unit to output signals having logic states corresponding to charging and discharging the input power, respectively;
a first delaying unit to delay the output signal of the switching unit by a first period;
a signal holding unit to receive the mode signal corresponding to the first level of voltage, and synchronize the mode signal with an output signal of the first delaying unit;
a second delaying unit to delay an output signal of the signal holding unit by a second period;
a third delaying unit to delay the output signal of the switching unit by a third period; and
a buffering unit to transmit the output signals from the second delaying unit and the third delaying unit as the mode signal to the power supply.

8. The computer system as claimed in claim 7, wherein:
the first delaying unit, the second delaying unit, and the third delaying unit set the first period, the second period, and the third period, respectively, to maintain the predetermined part of the mode signal generated by the mode determiner, and
the predetermined part of the mode signal generated by the mode determiner corresponds to the second level of voltage or to a level of voltage higher than the second level of voltage.

9. The computer system as claimed in claim 8, wherein the predetermined part of the mode signal corresponding to the second level of voltage or to the level of voltage higher than the second level of voltage is a first logic state opposite a second logic state corresponding to the first level of voltage.

10. The computer system as claimed in claim 7, wherein:
the first delaying unit, the second delaying unit, and the third delaying unit set the first period, the second period, and the third period, respectively, to convert the predetermined part of the mode signal generated by the mode determiner from the time when the input power begins to charge to the time when the predetermined delay period elapses after the input power is discharged,
the first delaying unit, the second delaying unit, and the third delaying unit can adjust the first period, the second period, and the third period, respectively, to increase and decrease the predetermined delay period, and
the predetermined part of the mode signal generated by the mode determiner corresponds to the first level of voltage.

11. The computer system as claimed in claim 10, wherein the first delaying unit, the second delaying unit, and the third delaying unit set the first period, the second period, and the third period, respectively, to maintain the predetermined part of the mode signal generated by the mode determiner from the time when the predetermined delay period elapses and the input power is discharged until the time when the input power begins to charge.

12. The computer system as claimed in claim 10, wherein the predetermined part of the mode signal corresponding to the first level of voltage is a second logic state opposite a first logic state corresponding to a second level of voltage.

13. A method supplying power to a computer system with a central processing unit and a plurality of power modes differing in a level of voltage to be supplied to the central processing unit according to operating states of the central processing unit, the method comprising:
generating a mode signal corresponding to one among the plurality of power modes;
lowering a difference in the level of voltage when the power mode is switched from a first level of voltage to a second level of voltage, wherein the second level of voltage is higher than the first level of voltage; and
supplying the level of voltage corresponding to the mode signal to the central processing unit.

14. The method as claimed in claim 13, wherein the lowering of the difference in the level of voltage when the power mode is switched from the first level of voltage to the second level of voltage comprises:
maintaining a predetermined part of the mode signal corresponding to one among the plurality of power modes when the predetermined part of the mode signal corresponds to the second level of voltage or to a level of voltage higher than the second level of voltage; or
converting a predetermined part of the mode signal corresponding to one among the plurality of power modes when the predetermined part of the mode signal corresponds to the first level of voltage.

15. The method as claimed in claim 14, wherein the predetermined part of the mode signal corresponding to the first level of voltage is a first logic state, and the predetermined part of the mode signal corresponding to the second level of voltage and a level of voltage higher than the second level of voltage is a second logic state opposite the first logic state.

16. The method as claimed in claim 14, wherein:
the supplying of the level of voltage comprises adjusting a level of power supplied to the central processing unit by alternately charging and discharging input power in a predetermined ratio based on the mode signal; and
the converting of the predetermined part of the mode signal comprises converting the mode signal from a time when the input power begins to charge to a time when a predetermined delay period elapses after the input power is discharged.

17. The method as claimed in claim 16, wherein the predetermined part of the mode signal is maintained from the time when the predetermined delay period elapses and the input power is discharged until the time when the input power begins to charge.

18. The method as claimed in claim 16, wherein the predetermined delay period can be increased to increase the level of voltage supplied to the central processing unit, and decreased to decrease the level of voltage supplied to the central processing unit.

19. A computer system with a central processing unit and a plurality of power modes differing in a level of voltage to be supplied to the central processing unit according to operating states of the central processing unit, the computer system comprising:
a mode controller to convert a predetermined part of a received mode signal corresponding to one among the plurality of power modes to lower a difference in the level of voltage when the power mode is switched from a first level of voltage to a second level of voltage, wherein the second level of voltage is higher than the first level of voltage.

20. The computer system as claimed in claim 19, wherein the mode controller converts the predetermined part of the received mode signal corresponding to the first level of voltage to correspond to the second level of voltage.

21. The computer system as claimed in claim 20, further comprising a power supply to adjust the level of voltage supplied to the central processing unit by alternately charging and discharging input power in a predetermined ratio based on the received mode signal after the received mode signal is converted or maintained by the mode controller, and
the mode controller converts the predetermined part of the mode signal from a time when the input power begins to charge to a time when a predetermined delay period elapses after the input power is discharged.

22. The computer system as claimed in claim 21, wherein the mode controller comprises:

a switching unit to output signals having logic states corresponding to charging and discharging the input power, respectively;
a first delaying unit to delay the output signal of the switching unit by a first period;
a signal holding unit to receive the received mode signal corresponding to the first level of voltage, and synchronize the received mode signal with an output signal of the first delaying unit;
a second delaying unit to delay an output signal of the signal holding unit by a second period;
a third delaying unit to delay the output signal of the switching unit by a third period; and
a buffering unit to transmit the output signals from the second delaying unit and the third delaying unit as the received mode signal to the power supply.

23. The computer system as claimed in claim 22, wherein:
the first delaying unit, the second delaying unit, and the third delaying unit set the first period, the second period, and the third period, respectively, to maintain the predetermined part of the received mode signal, and
the predetermined part of the received mode signal corresponds to the second level of voltage or to a level of voltage higher than the second level of voltage.

24. The computer system as claimed in claim 23, wherein the predetermined part of the received mode signal corresponding to the second level of voltage or to the level of voltage higher than the second level of voltage is a first logic state opposite a second logic state corresponding to the first level of voltage.

25. The computer system as claimed in claim 22, wherein:
the first delaying unit, the second delaying unit, and the third delaying unit set the first period, the second period, and the third period, respectively, to convert the predetermined part of the received mode signal from the time when the input power begins to charge to the time when the predetermined delay period elapses after the input power is discharged,
the first delaying unit, the second delaying unit, and the third delaying unit can adjust the first period, the second period, and the third period, respectively, to increase and decrease the predetermined delay period, and
the predetermined part of the received mode signal corresponds to the first level of voltage.

26. The computer system as claimed in claim 25, wherein the first delaying unit, the second delaying unit, and the third delaying unit set the first period, the second period, and the third period, respectively, to maintain the predetermined part of the received mode signal from the time when the predetermined delay period elapses and the input power is discharged until the time when the input power begins to charge.

27. The computer system as claimed in claim 26, wherein the predetermined part of the received mode signal corresponding to the first level of voltage is a second logic state opposite a first logic state corresponding to the second level of voltage.

* * * * *